US006121723A

United States Patent [19]

Sugawara et al.

[11] Patent Number: 6,121,723

[45] Date of Patent: Sep. 19, 2000

[54] GLASS PANEL FOR A CRT HAVING A STRENGTHENED FLAT FACE PORTION

[75] Inventors: Tsunehiko Sugawara; Toshihide Murakami; Takao Kuwashima, all of Funabashi, Japan

[73] Assignee: Asahi Glass Company Ltd., Tokyo, Japan

[21] Appl. No.: 09/023,120

[22] Filed: Feb. 13, 1998

[30] Foreign Application Priority Data

Feb. 27, 1997 [JP] Japan .................................... 9-044254

[51] Int. Cl.[7] ............................ H01J 31/00; H01J 29/10; H04N 5/65; H01K 1/28

[52] U.S. Cl. ..................... 313/477 R; 313/461; 348/821; 220/2.1 A

[58] Field of Search .................................... 313/407–408, 313/461, 477 R, 479, 482; 220/2.1 R, 2.1 A, 2.3 A, 2.3 R; 348/821, 823

[56] References Cited

U.S. PATENT DOCUMENTS

| | | | |
|---|---|---|---|
| 5,386,174 | 1/1995 | Ishii . | |
| 5,445,285 | 8/1995 | Sugawara et al. . | |
| 5,536,995 | 7/1996 | Sugawara et al. . | |
| 5,606,217 | 2/1997 | Hirai et al. . | |
| 5,698,939 | 12/1997 | Vriens et al. . | |
| 5,925,977 | 7/1999 | Sugawara et al. .................. | 313/477 R |

*Primary Examiner*—Vip Patel
*Assistant Examiner*—Mack Haynes
*Attorney, Agent, or Firm*—Oblon, Spivak, McClelland, Maier & Neustadt, P.C.

[57] ABSTRACT

A glass panel for a cathode ray tube having a substantially flat face portion and being safe and light in weight wherein the smallest value of the averaged radius of curvature of an outer face of the face portion is 25,000–50,000 mm and the outer face portion of the face portion has a compressive stress of 6–30 MPa in absolute value.

4 Claims, 2 Drawing Sheets

PRIOR ART FIGURE 3
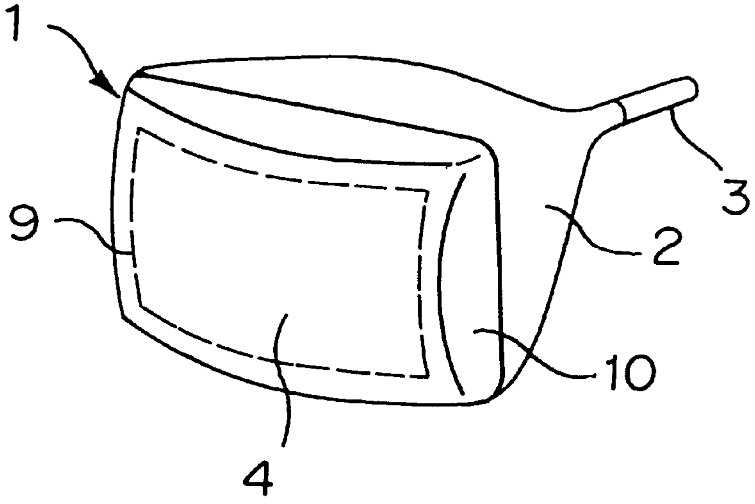
PRIOR ART FIGURE 4
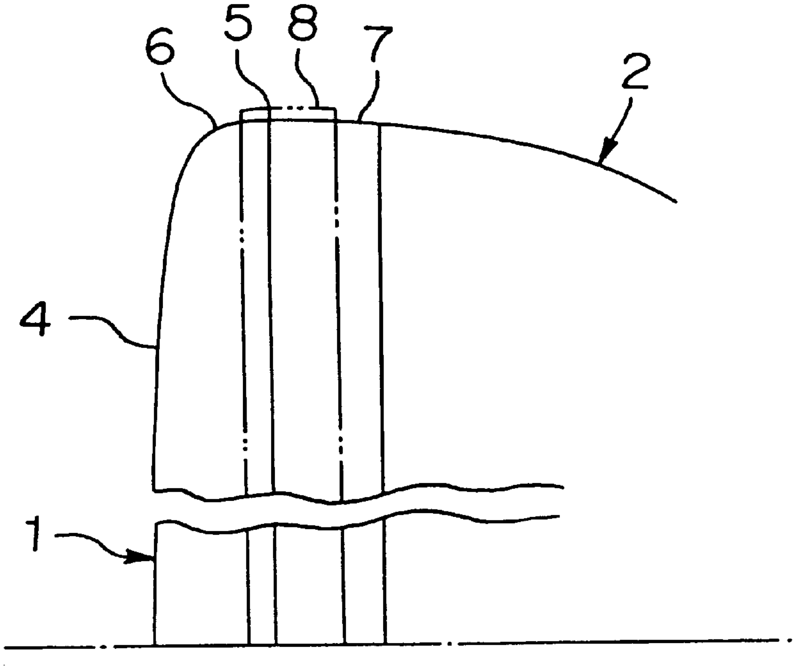

GLASS PANEL FOR A CRT HAVING A STRENGTHENED FLAT FACE PORTION

BACKGROUND OF THE INVENTION

1. Field of the Invention

The present invention relates to a glass panel for a cathode ray tube, in particular, a glass panel for a color cathode ray tube used mainly for a TV or a display device for industrial use.

2. Discussion of the Background

As shown in FIG. 3, a cathode ray tube is generally constituted by a glass bulb which comprises a panel 1 having a picture surface 9 of substantially rectangular shape, a funnel-shaped funnel 2 mounting thereon a deflection coil and a neck 3 for housing an electron gun. The panel 1 comprises a face portion 4 having a picture surface 9 and a skirt portion 10 which is formed contiguous to the face portion at a substantially right angle to thereby form a side wall. As shown in FIG. 4, the skirt portion 10 inclines forward and backward from an outer circumferential portion 5 having the largest diameter in the side wall (hereinbelow, referred to as the largest diameter portion 5), namely, the skirt portion 10 is provided with a forward inclination portion 6 which extends from the largest diameter portion 5 toward the face portion and a backward inclination portion 7 which extends in the opposite direction of the forward inclination portion 6 with respect to the largest diameter portion 5.

The inside of the cathode ray tube is kept in a high vacuum state so that electron beams reach the fluorescent layer. Accordingly, in the glass panel, there is a high deforming energy due to a difference between an inner pressure and an outer pressure. Further, since the cathode ray tube has an asymmetric structure unlike a shell structure having a spherical shape, there are many cases of causing a large scale destruction which invites overall collapse when once a destruction takes place. In particular, when the cathode ray tube receives a mechanical shock, an instantaneous destruction called an implosion phenomenon occurs whereby a large amount of sharp glass fragments may scatter.

To prevent such implosion phenomenon, an anti-implosion band 8 made of steel is generally provided at or in the vicinity of the largest diameter portion 5 formed between the forward inclination portion 6 and the backward inclination portion 7 of the skirt portion 10. The inner circumference of the anti-implosion band 8 is so designed as to be smaller than the outer circumference of the panel 2, and an expansion of the band tightens the face portion 4 from its side. A force given by the tightening produces a compressive force in the face portion 4 whereby occurrence of cracks in the panel and the expansion of the cracks are controlled; the destruction becomes mild, and the scattering of glass fragments resulted from the destruction is prevented.

Further, in the glass panel for a cathode ray tube, the face portion is generally curved in order to suppress the bending of the face portion due to an impact force and to improve the rigidity of the face portion. A curved shape formed in the face portion can convert a mechanical shock to the face portion into a compressive force in the face portion. The effect of the arched shape becomes large as the averaged radius of curvature R of the face portion 4 is smaller, which will be described after.

As another method of increasing the rigidity of the face portion, there is a method of increasing the thickness of the glass panel. Namely, the method is to increase the thickness of the face portion at its central portion (a face central portion) or to increase the thickness of a peripheral portion of the face portion (a face peripheral portion). By thickening the face central portion, the rigidity of the overall face portion can be increased. When the cathode ray tube is brought to a vacuum state, a high stress is occurred in the face peripheral portion. An increased thickness of such portion having a high stress can increase the rigidity of the face portion as well.

On the other hand, there have been employed various measures to improve the quality of picture images displayed in the cathode ray tube as a image displaying device. A curved face portion results a curved picture image displayed thereon. Accordingly, the face portion is desirably flat as possible. Further, since glass absorbs partly light, it is desirable that a difference of thickness between the face central portion and the face peripheral portion is reduced so that a picture image displayed has uniform brightness.

The conventional glass panel for a cathode ray tube was so designed that the face portion was curved, or the face central portion or the face peripheral portion was thickened in order to increase the rigidity of the glass panel and to assure saftiness as described above. In recent years, a demand for applying a function to improving the visibility of the cathode ray tube to the glass panel have been increasing along with an improvement of the performance. For this, demands for making the face portion 4 flat and for reducing the difference of thickness between the face central portion and the face peripheral portion have been increasing.

However, control for increasing the rigidity of the glass panel and assuring saftiness is contrary to control for making the face portion 4 flat and for reducing the thickness. In order to minimize the deformation of a picture image, the face portion should desirably be substantially flat. However, the flat face portion reduces the rigidity, hence, it is impossible to completely prevent the implosion.

Further, when the thickness of the face portion is increased to prevent a danger of the implosion, the weight of the cathode ray tube is increased, which is a big problem in the cathode ray tube. When the thickness of the face peripheral portion is increased, a picture image in the face peripheral portion becomes dark in comparison with the face central portion.

SUMMARY OF THE INVENTION

It is an object of the present invention to provide a glass panel for a cathode ray tube in which the face portion is made flat to the critical extent to minimize the deformation of a picture image and which is safe, easy to see and light in weight while assuring the rigidity of the glass panel.

In accordance with the present invention, there is provided a glass panel for a cathode ray tube comprising a face portion of substantially rectangular shape for displaying a picture image and a skirt portion formed contiguous to the face portion at a substantially right angle, wherein the largest length M along a diagonal line of the glass panel is 360 mm or more, the smallest value of the averaged radius of curvature of an outer face of the face portion in an optional direction passing through the center of the face portion is 25,000–50,000 mm, and the outer face portion of the face portion has a compressive stress of 6–30 MPa in absolute value.

In the above-mentioned invention, the smallest thickness T (mm) at the center of the face portion, the largest length M (mm) along the diagonal line and the largest thickness $T_1$ (mm) of the face portion have relations of $3.0 \leqq T-0.015M \leqq 5.5$ and $1<T_1/T<1.26$.

BRIEF DESCRIPTION OF THE DRAWINGS

FIG. 3 is a perspective view of a conventional cathode ray tube; and

FIG. 4 is a side view partly omitted of a conventional glass panel for a cathode ray tube.

DESCRIPTION OF THE PREFERRED EMBODIMENTS

Preferred embodiments of the present invention will be described with reference to FIGS. 1 and 2.

The glass panel used in the present invention is of a large size in which the largest length along a diagonal line of the panel is 360 mm or more. A panel having a smaller length along a diagonal line is not strongly required to reduce its weight in design, and the strength of the panel and the deformation of a picture image displayed in the panel are not so troublesome.

In the present invention wherein the weight of such large-sized panel is to be reduced, a strengthening treatment is conducted to an outer face portion of the face portion so that the absolute value of a compressive stress in the face portion is 6–30 MPa. The strengthening treatment is obtainable by, for example, imparting physical strengthening, i.e., by cooling or annealing that portion after molding. The reason why attention is paid to a compressive stress in the outer face portion of the face portion is because the strength of the outer face portion is in particular important from the standpoint of the shape of the panel and the purpose of use.

When the compressive stress is smaller than 6 MPa, a desired strength can not be provided for the panel. In order to compensate the strength, it is necessary to increase the thickness of the face portion, which is contrary to the requirement of reducing the weight. On the other hand, when the compressive stress exceeds 30 MPa, the tensile stress of a central layer in a thickness direction increases, which results a violent destruction. Generally, as the size of the panel is increased, a larger strength is required. There is a tendency that the tensile stress is increased as the size of the panel is larger. In this case, control is generally so made that the face central portion and the face peripheral portion have a uniform distribution of stress as possible.

Figure 1:
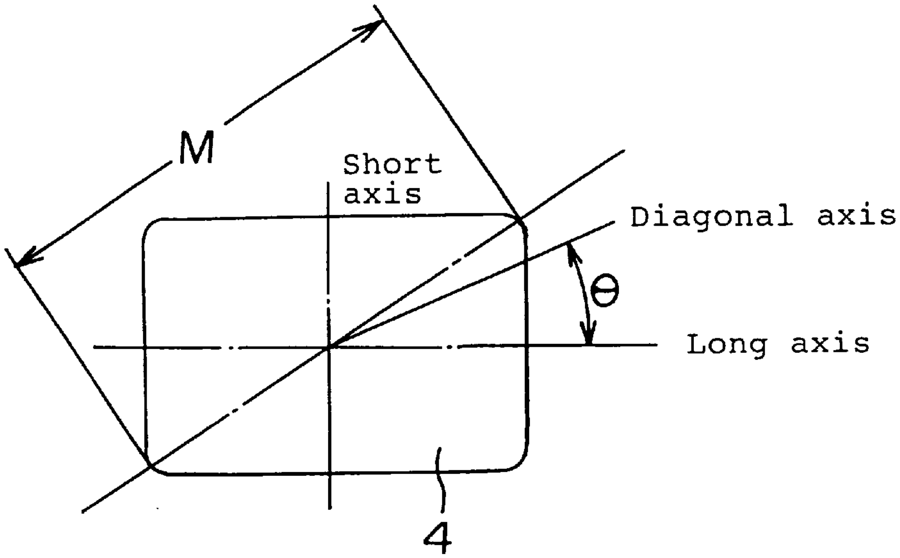
FIG. 1 is a front view of an embodiment of the glass panel for a cathode ray tube according to the present invention.
Figure 2:
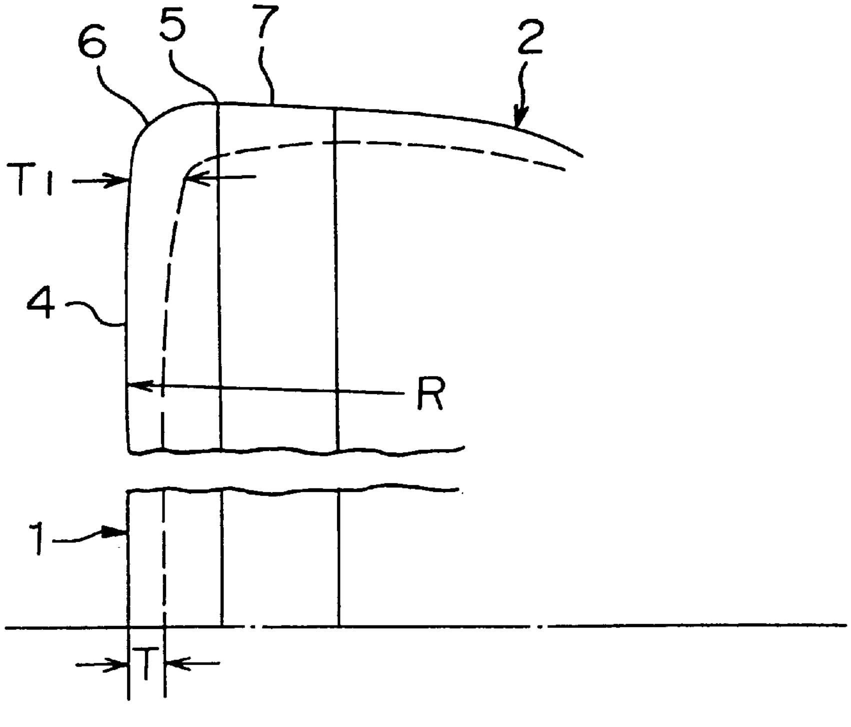
FIG. 2 is a side view partly omitted showing a state that the glass panel for a cathode ray tube is sealingly attached to the funnel, in view of a direction where the averaged radius of curvature of an outer face of the face portion has the smallest value.

In the present invention, a value R indicates the averaged radius of curvature of an outer face portion of the face portion in an optional angular direction $\theta$ which is formed by a line passing through the center of the face portion and the long axis of the face portion as shown in FIG. 1. If the shape of the outer face portion is spherical, the value R is the same even in any angular direction. However, when it is non-spherical, the value R varies depending on $\theta$. In the present invention, the smallest value of R is within 25,000–50,000 mm.

When the value R is smaller than 25,000 mm, the curve of the face portion is conspicuous and the purpose of minimizing the deformation of a picture image by making the face portion flat as possible can not be achieved. Further, when the value R is larger than 50,000 mm, the shape of the face portion becomes substantially flat whereby the rigidity of the face portion is reduced. In this case, when a cathode ray tube to which the face portion is connected is vacuumed and a pressure is applied to the face portion from an outer side, the effect by a curved shape is not obtained.

Accordingly, in designing the glass panel, it is essential for the face portion to have at least an outwardly projecting curved surface. In the large-sized glass panel of the present invention, the upper limit of the smallest value of the averaged radius of curvature is 50,000 mm. Further, the face portion has an outwardly projecting curved surface having a radius of curvature of prescribed value or higher in any direction. If the outwardly projecting curved surface is a cylindrical surface, it is entirely flat in its axial direction and has no radius of curvature although it provides an outwardly curved surface as a whole.

It is preferable that the glass panel of the present invention has thicknesses and dimensions defined by $3.0 \leqq T-0.015M \leqq 5.5$ and $1<T_1/T<1.26$ where T (mm) represents the thickness at a central portion of the face portion, $T_1$ (mm) represents the largest thickness of the peripheral portion of the face portion (more precisely, the peripheral portion of the picture surface) and M (mm) represents the largest length along a diagonal line (v. FIG. 1). Since $T_1$ is the largest thickness of the peripheral portion, it is not always in a cross-section where the averaged radius of curvature is the smallest.

When $T-0.015M<3$, the outer face of the face portion does not have the above-mentioned outwardly projecting curved surface, and the compressive stress value is too small to assure a sufficient strength. On the other hand, when $T-0.015M>5.5$, the glass panel becomes heavy although a sufficient strength can be provided.

Further, when the thickness of the peripheral portion is relatively thick in comparison with the central portion of the face portion, a picture image displayed in the peripheral portion is dark in comparison with the central portion. Accordingly, it is preferable that $T_1/T<1.26$. When $T_1/T \leqq 1$, a sufficient strength can not be provided and a smooth flow of molten glass in a mold can not be obtained to thereby reduce the quality. With respect to the shape of an inner surface of the face portion, a shape which satisfies $1<T_1/T<1.26$ is appropriate although the shape of the inner surface is not in particular limited.

EXAMPLES

Glass panels having a useful screen of 68 cm (manufactured by Asahi Glass Co., Ltd., Glass code: H5702) were prepared wherein dimensions are shown in Examples 1, 2 and 5 in Table 1 and Table 2, and the same glass panel were prepared by using a conventional technique wherein dimensions are shown in Examples 3, 4, 6 and 7 (Comparative Examples) in Table 1 and Table 2.

The strength of these glass panels was evaluated based on the impact test ruled by the safety authentication organization (UL/CSA), which is employed in a North American area. The impact test is classified into two kinds: a test (a ball test) in which a steel ball of 51 mm in diameter is impacted at an energy of 7 J to a cathode ray tube and a test (a missile test) in which a bullet-like impactor having a top end of 51 mm in diameter is impacted at an energy of 7–20 J to a cathode ray tube wherein a scratch of 100 mm is formed in an edge of the face portion. Evaluation of saftiness was made by measuring an amount of glass pieces scattering in a prescribed area.

In addition to such evaluation, another evaluation was made as to a rate of occurrence of implosion phenomenon.

The impact position was determined to the outermost portion of an impact region ruled by the above-mentioned regulations. Namely, the impact position is the position where the implosion phenomenon usually occurs. Specifically, in the ball test, the position was 25 mm in the horizontal direction and 25 mm in the vertical direction from a corner portion of the face portion, and in the missile test, the position was on a diagonal line in an outer periphery of the doughnut zone ruled by the regulations. The energy used in the missile test was 10 J.

In Table 1, no implosion took place in Examples 1 and 2 in the ball test and no rejection took place. In Example 3 where the smallest value in the averaged radius of curvature of the outer face of the face portion was 100,000 mm, i.e., the face portion was substantially flat, an implosion rate of 25% took place and the rejection rate was 40%. In the missile test, no implosion and rejection took place in Examples 1 and 2. However, there were found implosion and rejection in Example 3. Although there were no implosion and rejection in Example 4, a curved surface was easily distinguishable by visual observation and there was confirmed a deformation of picture image.

TABLE 1

| | Example 1 | Example 2 | Example 3 | Example 4 |
|---|---|---|---|---|
| Largest length along diagonal line M (mm) | 724 | 724 | 724 | 724 |
| Smallest value of averaged radius of curvature (mm) | 30,000 | 50,000 | 100,000 | 10,000 |
| Compressive stress of outer face portion (MPa) | 13 | 13 | 13 | 13 |
| Thickness of central portion T (mm) | 16 | 16 | 16 | 16 |
| Visual shape | Flat | Flat | Flat | Curved |
| Ball test | | | | |
| Implosion rate (%) | 0 | 0 | 25 | 0 |
| Rejection rate (%) | 0 | 0 | 40 | 0 |
| Missile test | | | | |
| Implosion rate (%) | 0 | 0 | 60 | 0 |
| Rejection rate (%) | 0 | 0 | 70 | 0 |

Table 2 shows Examples wherein the glass panels are prepared in consideration of the thickness and the weight. In Example 5, the difference of thickness between the face central portion and the face peripheral portion was further reduced in comparison with that in Example 1. In Examples 6 and 7, the averaged radius of curvature was 30,000 mm in the same manner as in Example 1, and no physical strengthening was not conducted. The shape of the glass panel of Example 7 was the same as that of Example 1.

Table 2 shows that in Example 7, implosion and rejection have occurred in both the ball test and the missile test. Example 6 is the case that a problem of strength is eliminated in the glass panel of Example 7 without conducting the physical strengthening. The glass panel of Example 6 had a large thickness and was 22.4 kg in which the weight was increased 10% in comparison with that of Example 1. Further, since $T_1/T=1.28$ which means a large difference of thickness between the face peripheral portion and the face central portion, a picture image in the face peripheral portion is relatively dark.

In Example 5, the difference of thickness between the face central portion and the face peripheral portion could further be reduced by conducting the physical strengthening without substantially increasing the weight. In this case, there was no implosion and rejection due to an insufficient strength.

TABLE 2

| | Example 1 | Example 5 | Example 6 | Example 7 |
|---|---|---|---|---|
| Largest length along diagonal line M (mm) | 724 | 724 | 724 | 724 |
| Smallest value of averaged radius of curvature (mm) | 30,000 | 30,000 | 30,000 | 30,000 |
| Compressive stress of outer face portion (MPa) | 13 | 13 | 0 | 0 |
| Thickness of central portion T (mm) | 16 | 16.3 | 18 | 16 |
| Thickness of peripheral portion $T_1$ (mm) | 19.8 | 18.8 | 23.0 | 19.8 |
| T-0.015M (mm) | 5.14 | 5.44 | 7.14 | 5.14 |
| $T_1/T$ | 1.23 | 1.15 | 1.28 | 1.23 |
| Weight (kg) | 20.8 | 21.0 | 22.4 | 20.8 |
| Ball test | | | | |
| Implosion rate (%) | 0 | 0 | 0 | 5 |
| Rejection rate (%) | 0 | 0 | 0 | 5 |
| Missile test | | | | |
| Implosion rate (%) | 0 | 0 | 0 | 10 |
| Rejection rate (%) | 0 | 0 | 0 | 10 |

In the glass panel for a cathode ray tube of the present invention, the face portion is substantially flat and the difference of thickness between the central portion and the peripheral portion is relatively small. Accordingly, a uniform brightness is obtainable and visibility is excellent. Further, the strength of the glass panel is improved by conducting a physical strengthening, and the face portion has an outwardly projecting curved surface having the smallest curvature. Accordingly, the glass panel obtained is safe and light in weight and suitable for a cathode ray tube, especially for a color cathode ray tube.

What is claimed is:

1. A glass panel for a cathode ray tube comprising a face portion of substantially rectangular shape for displaying a picture image and a skirt portion formed contiguous to the face portion at a substantially right angle, wherein the largest length M along a diagonal line of the glass panel is 360 mm or more, the smallest value of the averaged radius of curvature of an outer face of the face portion in any direction passing through the center of the face portion is 25,000–50,000 mm, and the outer face portion of the face portion has a compressive stress of 6–30 MPa in absolute value.

2. A glass panel for a cathode ray tube according to claim 1, wherein the smallest thickness T (mm) at the center of the face portion, the largest length M (mm) along the diagonal line and the largest thickness $T_1$ (mm) of the face portion have relations of $3.0 \leqq T-0.015M \leqq 5.5$ and $1<T_1/T<1.26$.

3. A cathode ray tube comprising a glass panel and a funnel sealingly attached to the glass panel, said glass panel comprising a face portion of substantially rectangular shape for displaying a picture image and a skirt portion formed contiguous to the face portion at a substantially right angle, wherein the largest length M along a diagonal line of the glass panel is 360 mm or more, the smallest value of the averaged radius of curvature of an outer face of the face portion in any direction passing through the center of the face portion is 25,000–50,000 mm, and the outer face portion of the face portion has a compressive stress of 6–30 MPa in absolute value.

4. A cathode ray tube according to claim 3, wherein the smallest thickness T (mm) at the center of the face portion, the largest length M (mm) along the diagonal line and the largest thickness $T_1$ (mm) of the face portion have relations of $3.0 \leqq T-0.015M \leqq 5.5$ and $1<T_1/T<1.26$.

* * * * *